United States Patent [19]
Honeycutt

[11] 3,840,693
[45] Oct. 8, 1974

[54] IGNITER WIRE INSULATOR ASSEMBLY
[75] Inventor: John H. Honeycutt, Madison, Ala.
[73] Assignee: The United States of America as represented by the Secretary of the Army, Washington, D.C.
[22] Filed: Jan. 8, 1974
[21] Appl. No.: 431,821

[52] U.S. Cl. .............................. 174/70 R, 89/1.814
[51] Int. Cl. .............................................. F41f 3/04
[58] Field of Search ............. 174/68 R, 70 R, 74 R; 317/79, 80; 89/1.814, 28 A, 135; 102/70.2 R, 70.2 A

[56] References Cited
UNITED STATES PATENTS

| | | |
|---|---|---|
| 2,479,590 | 8/1949 | Pollock ........................ 89/135 UX |
| 3,435,726 | 4/1969 | Gabler .......................... 89/1.814 X |
| 3,504,593 | 4/1970 | Ricks et al. .................... 89/1.814 X |
| 3,513,749 | 5/1970 | Magnant ........................ 89/1.814 X |
| 3,765,339 | 10/1973 | De Angelis et al. ........ 102/70.2 R X |

Primary Examiner—Laramie E. Askin
Attorney, Agent, or Firm—Edward J. Kelly; Herbert Berl; Charles R. Carter

[57] ABSTRACT

An assembly for use in insulating an electrical igniter wire from the heat and erosion effects of rocket motor exhaust gases. The wire is enclosed in an envelope consisting of a Teflon covering and a stainless steel shield. The enveloped wire is disposed in a slot of the igniter arm and protected by an insulator at its point of connection with the igniter pin.

2 Claims, 1 Drawing Figure

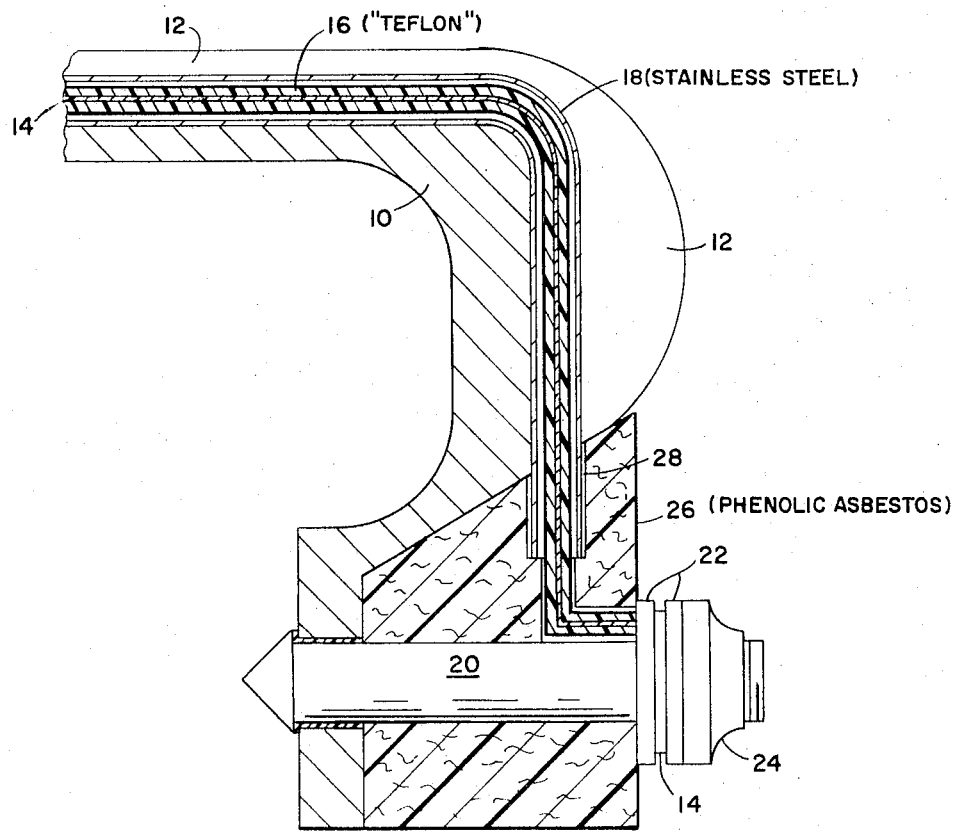

IGNITER WIRE INSULATOR ASSEMBLY

BACKGROUND OF THE INVENTION

This invention relates to the field of igniter wire insulator assemblies. Current concepts for insulating the igniter wire from rocket exhaust have resulted in numerous failures during field use. After a number of rocket firings, the insulation has eroded away and caused electrical shorts in the electrical system of the rocket launcher.

SUMMARY OF THE INVENTION

The present invention has overcome the problem of wire insulation erosion by enclosing the igniter wire in an envelope. This enveloping effect has insulated the wire from the heat and erosion effects of the rocket motor exhaust gases.

This invention may be better understood from the following detailed description taken in conjunction with the accompanying drawing.

BRIEF DESCRIPTION OF THE DRAWING

The single FIGURE shown is a sectional view of the igniter wire insulator assembly carried by an igniter arm.

DESCRIPTION OF THE PREFERRED EMBODIMENT

Reference numeral 10 indicates an igniter arm having a slot 12 therein for carrying an electrical igniter wire 14. This igniter wire is enclosed in an envelope which includes a Teflon insulation covering 16 and a stainless steel shielding tube 18. The igniter wire is connected to an igniter pin 20 between washers 22 and secured thereto by a lock nut 24. An insulator 26 of phenolic asbestos material is provided with a wire passageway 28 therein for protecting the wire and shielding tube from the point where it leaves the igniter arm to where it is connected to the igniter pin. The slot 12 in the igniter arm further envelops the wire for protection against the rocket motor exhaust gases. The use of a stainless steel shielding tube and a phenolic asbestos insulator has provided a successful solution to the heat and erosion effects of rocket exhaust gases on igniter wires.

I claim:

1. An assembly for enveloping and insulating an igniter wire from rocket motor exhaust gases comprising: an igniter arm provided with a slot therein; an igniter wire disposed in said slot, said wire being provided with an insulation covering; a stainless steel shielding tube encompassing said insulated wire and an insulator enclosing said wire and said tube for protection against erosion of said exhaust gases.

2. An assembly as set forth in claim 1 wherein said insulation covering is polytetrafluoroethylene and said insulator is phenolic asbestos.

* * * * *